United States Patent
Cheng

[11] Patent Number: 5,918,536
[45] Date of Patent: Jul. 6, 1999

[54] INDIRECT HEAT BARBECUE GRILL

[76] Inventor: Wen-Ho Cheng, P.O. Box 82-144, Taipei, Taiwan

[21] Appl. No.: 09/203,505

[22] Filed: Dec. 1, 1998

[51] Int. Cl.[6] ...................................................... A47J 37/00
[52] U.S. Cl. ................................ 99/447; 99/389; 99/401; 99/450; 126/25 R; 126/9 R
[58] Field of Search ............................... 99/339, 340, 385, 99/389–391, 400, 401, 444–446, 447, 450, 482; 126/25 R, 25 A, 25 AA, 41 R, 41 A, 41 B, 9 R

[56] References Cited

U.S. PATENT DOCUMENTS

| | | | |
|---|---|---|---|
| 1,836,894 | 12/1931 | Bedigian | 99/447 X |
| 3,140,651 | 7/1964 | Barnett | 99/389 X |
| 3,742,838 | 7/1973 | Luschen et al. | 99/389 |
| 3,783,855 | 1/1974 | Newinger | 126/25 R |
| 4,072,092 | 2/1978 | Kohli | 99/389 |
| 4,089,258 | 5/1978 | Berger | 99/339 |
| 4,627,410 | 12/1986 | Jung | 126/25 A |
| 5,431,093 | 7/1995 | Dodgen | 99/446 X |
| 5,499,574 | 3/1996 | Esposito | 126/25 R |
| 5,603,255 | 2/1997 | Nouvelot et al. | 99/401 X |
| 5,653,159 | 8/1997 | Quemin et al. | 99/447 X |
| 5,655,437 | 8/1997 | Vitacca | 99/400 |
| 5,836,295 | 11/1998 | Faraj | 99/390 X |

*Primary Examiner*—Timothy F. Simone
*Attorney, Agent, or Firm*—A & J

[57] ABSTRACT

An indirect heat barbecue grill includes a frame body having an opening at the top section thereof, which defines/grilling a heating area. A heat source area is located at one lateral side of the heating/grilling area, within the barbecue grill. A charcoal tray is located at the heat source area. The present invention is characterized in that a linking hood is mounted to the heat source area and located across the charcoal tray which insulates direct heat from the charcoal to reach the frame body and directs heat energy to the heating/grilling area.

6 Claims, 7 Drawing Sheets

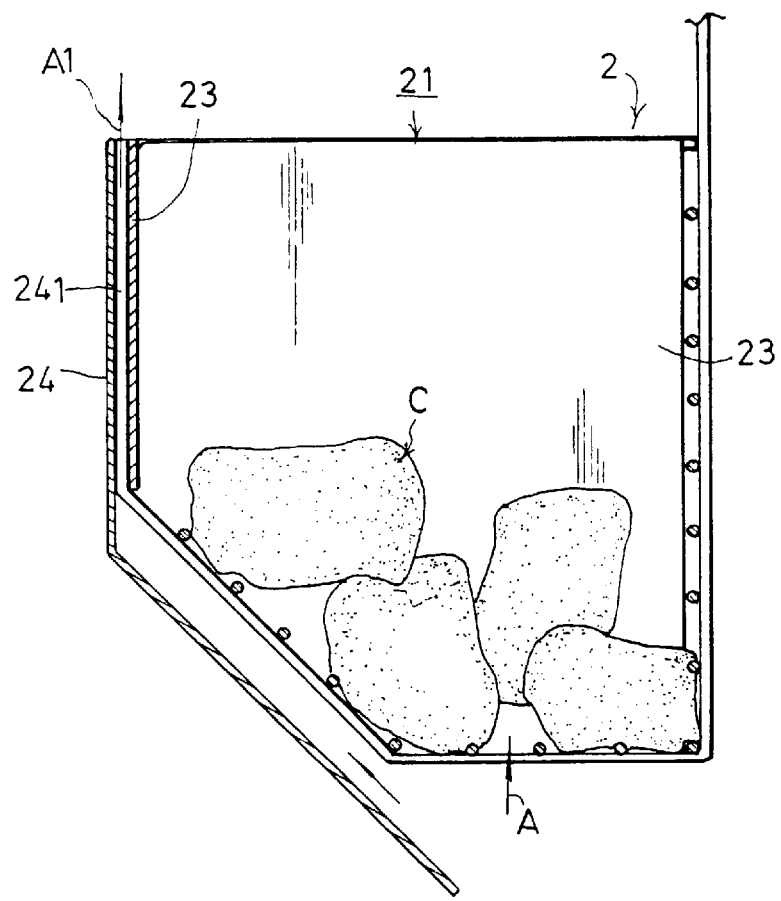
FIG·4
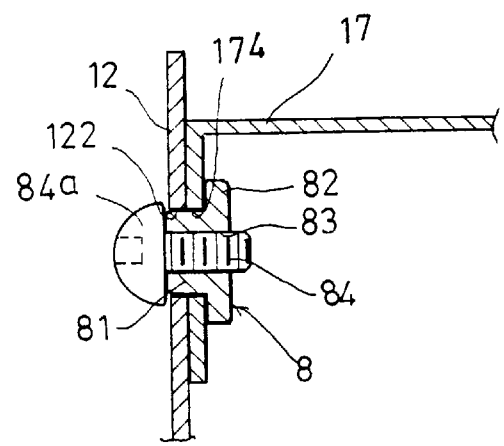
FIG·5

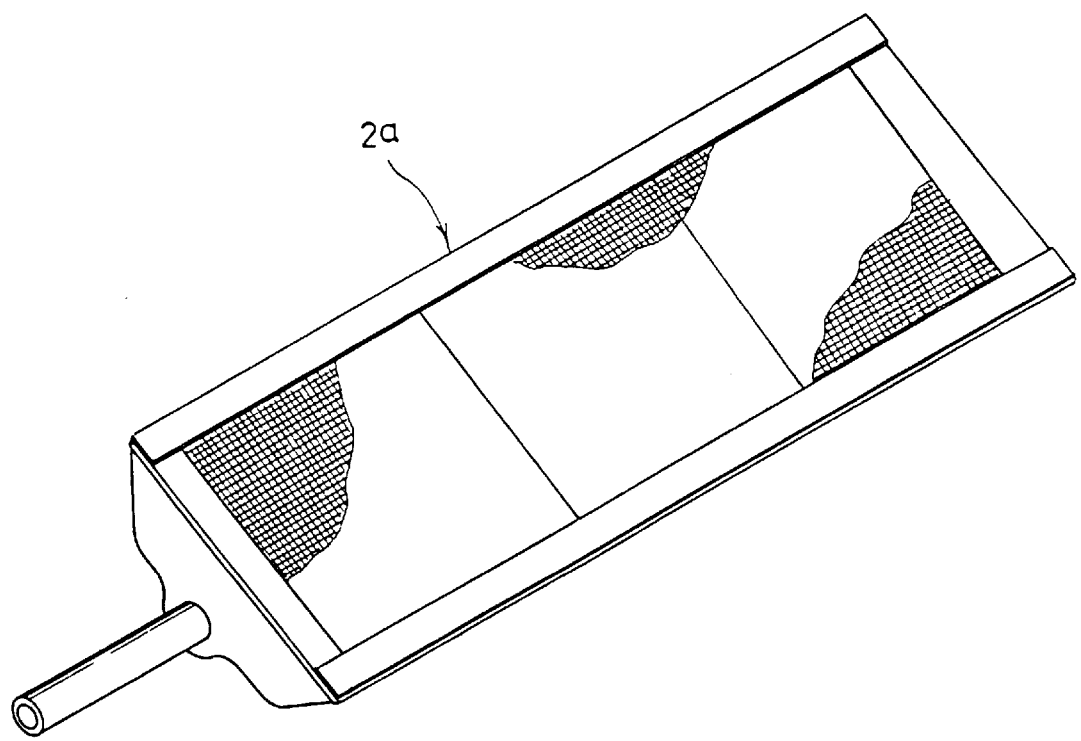
FIG·8

INDIRECT HEAT BARBECUE GRILL

BACKGROUND OF THE INVENTION

1. Field of the invention

The present invention relates to a barbecue grill, in particular, to a barbecue grill which employs indirect heat for heating/grilling. The barbecue grill comprises a frame body being provided with a linking hood to direct heat energy from charcoal to heat/grill food located at a heating area and to insulate direct charcoal heat to the frame body. The grill excludes the direct heating on food.

2. Description of the Prior Art

The applicant of the present invention filed a U.S. patent application related to a barbecue grill on May 5, 1998 and given Ser. No. 09/071,988 which comprises a frame body having a plurality of edge wall defining an opening to form a heating/grilling area. Within the frame body and at one lateral edge of the heating/grilling area, a heat source area is formed. At least a charcoal tray is disposed within the heat source area for the user to burn charcoal. Heat energy produced from the burnt charcoal is directed along the edge wall to the food located at the heating/grilling area and indirectly heats or grills the food. Thus, direct heating on the food is avoided. However, the disadvantages of such barbecue grill are as follows:

(i) The frame body is located at the guiding cover, which is at a position directly on the top of the charcoal tray, and is directly heated by charcoal fire. A heat insulation board is available to block the heat but the heat insulation effect is poor due to the reason that the insulation board is too closely connected to the guiding cover.

(ii) Although heat insulation boards are mounted to the surrounding of the charcoal tray, the edge wall of the frame body is too close to the tray, therefore, this causes the high temperature of the edge wall.

(iii) As the guiding hood is pivotally hinged to the edge wall by means of pegs and bolts-and-nuts, and is directly rubbed against the pegs or bolts/nuts, it becomes worn-out and cannot be lifted up smoothly after long period of operation.

Accordingly, the present invention aims, at least in preferred embodiments, to overcome or mitigate such disadvantages or drawbacks, and to provide a barbecue grill which employs indirect heating to cook or grill food.

SUMMARY OF THE INVENTION

In accordance with the present invention, there is provided an indirect heat barbecue grill comprising (a) a frame body having an opening at the top section thereof defining a heating/grilling area; (b) a heat source area being formed at one edge of the heating/grilling area; and (c) a charcoal tray located within the heat source area, characterized in that a linking hood is pivotally hinged at the heat source area, and is located beyond and on top of the charcoal tray to insulate direct heat from reaching the frame body but to direct heat energy from the charcoal to the heating/grilling area.

It is an object of the present invention to provide a barbecue grill, wherein the heat energy will not directly contact with the food which are to be grilled.

It is yet another object of the present invention to provide a barbecue grill, wherein the heat energy is directed to the food indirectly.

It will be appreciated that the barbecue grill in accordance with the present invention comprises a linking hood to direct the heat energy.

BRIEF DESCRIPTION OF THE DRAWINGS

FIG. 4 is a sectional view of the charcoal tray of the barbecue grill in accordance with the present invention.

FIG. 5 is a sectional view along line 5—5 of FIG. 3 of the present invention in accordance with the present invention.

FIG. 8 is a schematic view of an infrared stove in accordance with the present invention.

DETAILED DESCRIPTION OF THE PREFERRED EMBODIMENT

Figure 1:
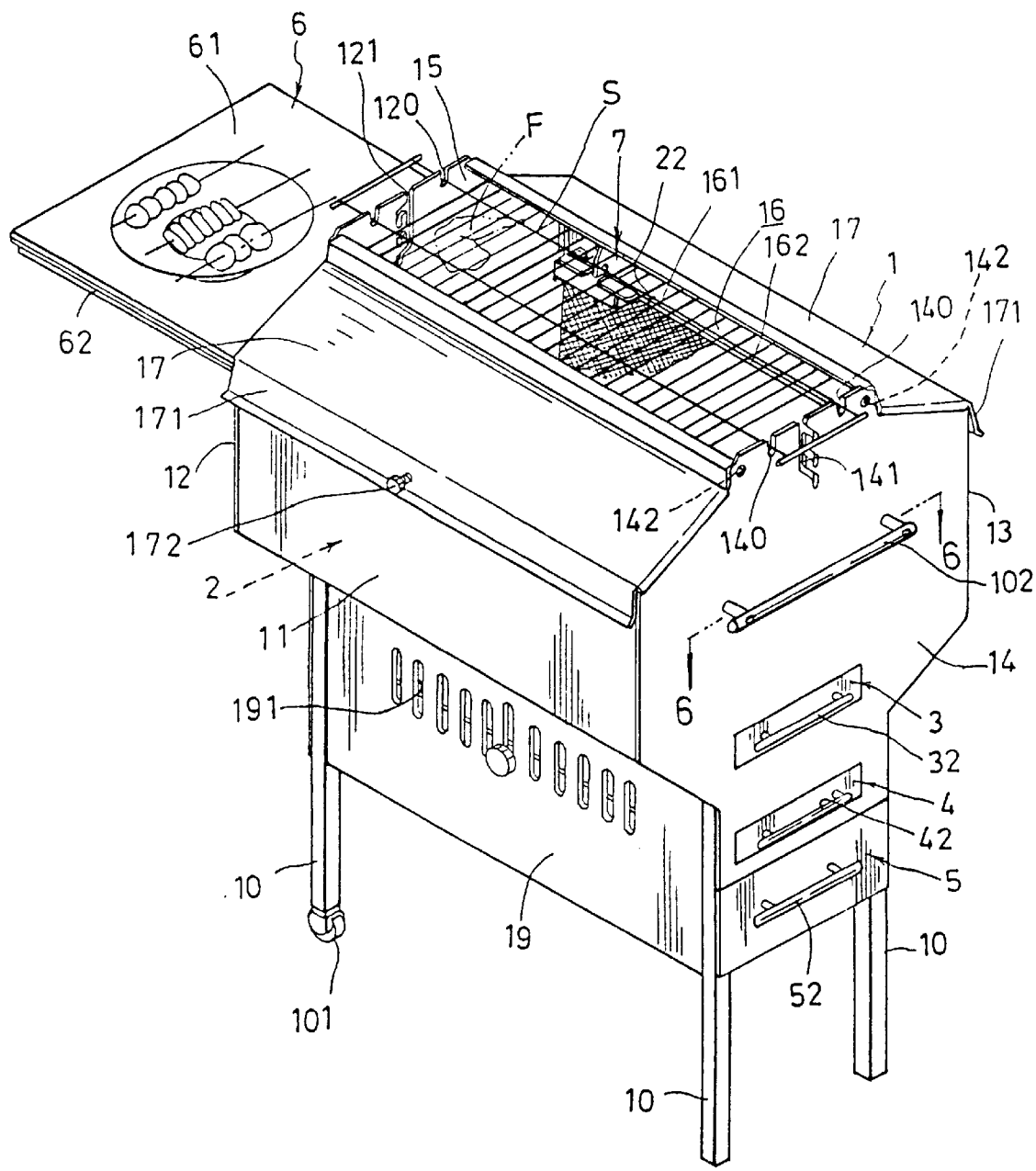
FIG. 1 shows a perspective view of a barbecue grill in accordance with the present invention.

Referring initially to the drawings, FIG. 1 to 6 show an indirect heat, barbecue grill comprising a hollow frame body (1) having a plurality of supportive legs (10) with four edge walls (11, 12, 13, 14) being formed in between the legs (10) to form said frame body (1), a heating/grilling area (15) being formed at the top section of the frame body (1) and a pair of recesses (120, 140) being formed at the top of the edge wall (12, 14) of the heating/grilling area (15) to stabilize a cooking grid (5). At the edge walls (12, 14), a pair of corresponding slots (121, 141) are provided for the mounting of a horizontal bar for rotatable grilling food of larger size. A heat source area (16) is located at one edge of the heating/grilling area (15). An insulation net (161) is transversely formed within the heat source area (16), and in between the edge walls (12, 14). A suspension bar (162) is mounted across the two edge wall (12, 14). At least a charcoal tray (2) having a plurality of fastening hooks (22) are mounted at the outer edge of the suspension rod (162). In accordance with the present invention, a guiding cover (17) is located at the lateral edge of the heating/grilling area (15) and in between the edge wall (12,14). The guiding cover (17) is located directly on and covers the top of the heat source area (16), and the end section of the board edge (171) of the cover (17) is formed on the top of the edge walls (11,13). A control nut (172) is screwed to the board edge (171) such that the end section of the nut (172) passes through the board edge (171) and urges against the edge wall (11,13). Thus, the adjustment of the control nut (172) can regulate the distance between the board edge (171) and the corresponding edge wall (11,13) so as to control the air stream from the outside into the frame body (1).

In accordance with the present invention, the suspension bar (162) is provided with a protruded hinge plate (162a) so as to pivotally hinge the linking hood (7). The linking hood (7) comprises a board body (71) having a protruded lateral wall section (72) extended downward, and the section (72) passes through an aperture (721) so as to hingely cover the hinge plate (162a). A lateral wall (73) is extended downward at a first end of the plate body (71), and on top of the first end of the plate body (71), a linking rope (7a) is connected. The end section of the linking rope (7a) is connected to the inner edge of the guiding cover (17). Thus, the linking hood (7), most of the time covers the top of the charcoal tray (2). The plate body (71) is provided to insulate the heat of the charcoal to heat the guiding cover (17). In other words the plate body (71) has an heat insulation effect. The guiding cover (17) directs the heat energy of the charcoal (on the charcoal tray (2)) to flow along the plate body (71) and to the exist (7b) formed by lateral wall section (72) and then the heat energy is transferred to the heating/grilling area (15) of the frame body (1) to heat or grill food.

Figure 3:
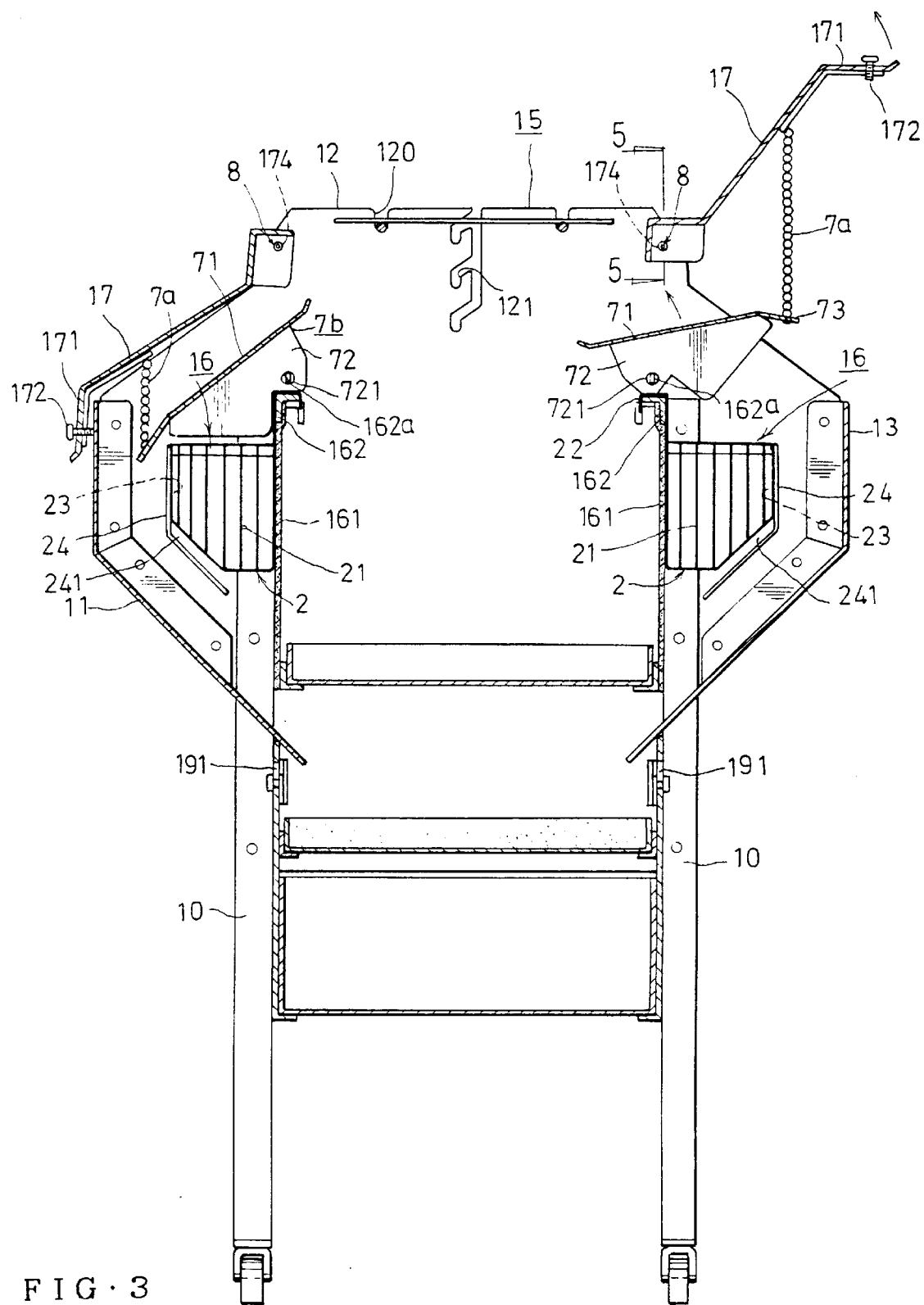
FIG. 3 is a sectional view showing the structure of the barbecue grill in accordance with the present invention.

When the user lifts up the guiding cover (17), as shown in FIG. 3, the linking rope (7a) causes a first lateral end of the linking hood (7) to be simultaneously lifted up. At this instance, the linking hood (7) is rotatably opened about the hinged plate (162a), and the top opening (inlet) of the charcoal tray (2) is thus exposed. Therefore, the user can add new charcoal into the charcoal tray (2).

As shown in the figures, the linking hood (7) does not contact directly with the guiding cover (17) and therefore, a better heat insulation is thus provided, and the user will not get burnt when the cover (17) is accidentally touched.

Figure 2:
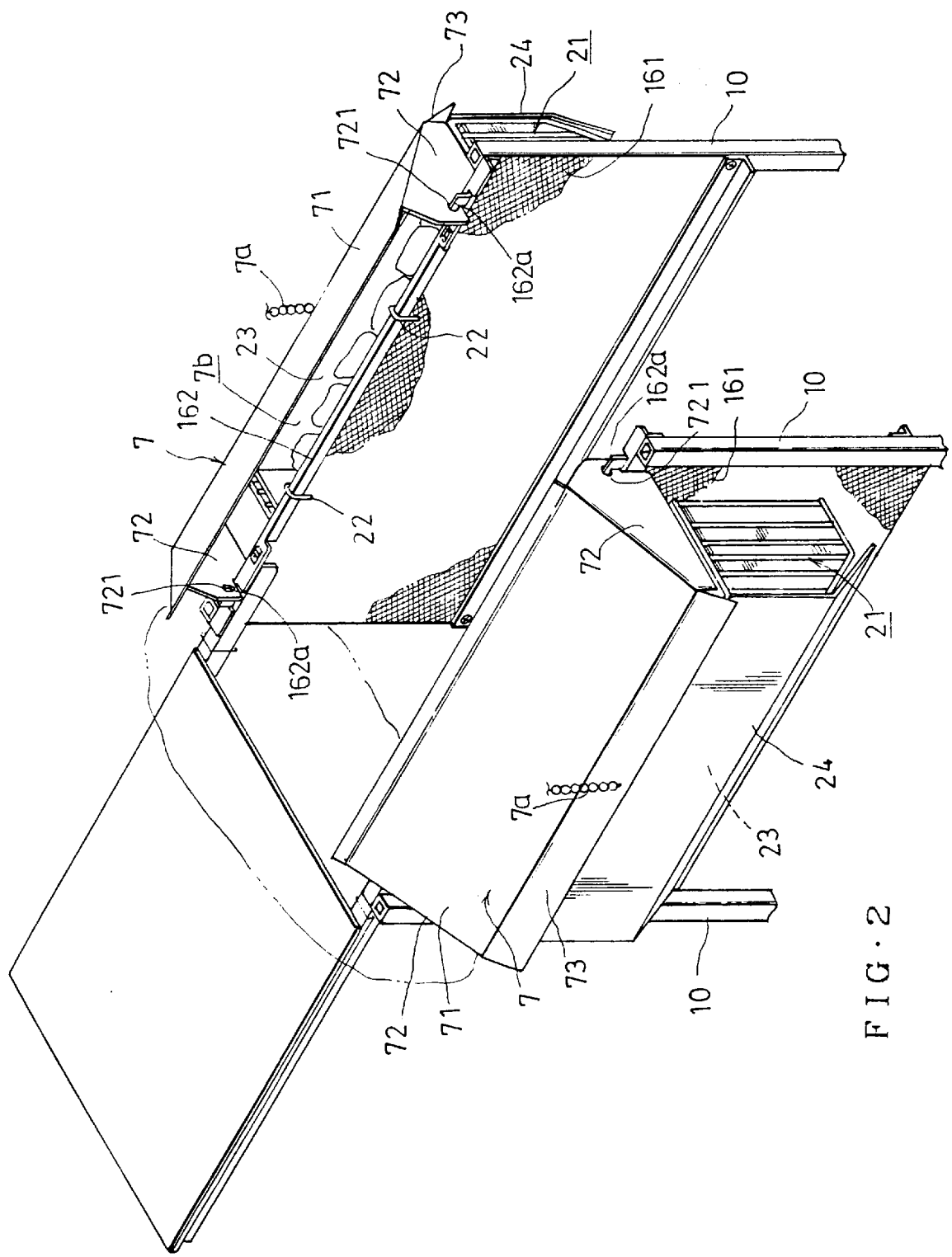
FIG. 2 is a schematical view showing the structure (in part) of the barbecue grill in accordance with the present invention.

In accordance with the present invention, the charcoal tray (2) is a framework (21) formed a plurality of bars. Except one inner edge close to the heat insulation net (161),a heat insulation board (23) is provided to all the surrounding inner edge of the framework (121). The external edge of the framework (21) is connected to a guiding board (24), as shown in FIGS. 2 and 4. An air passage (241) is defined by the guiding board (24) and the heat insulation board (23), and the bottom end of the guiding board (24) is extended to the bottom end of the framework (21). Thus, when the charcoal (c) within the frame work (21) is burning, air (A) being entered via a channel (191) of the bottom end of the framework (21) as flows upward along the guiding board (24). That is, the air (A) flows from the bottom end of the framework (21) to the charcoal (c) so as to increase the burning of charcoal.

In accordance with the invention, a partial of the air (A1) flows upward along the air passage (241) formed in between the guiding board (24) and the heat insulation board (23), and rapidly disperses heat from the guiding plate (24) so that the temperature of the edge wall (11, 13) is lowered.

As shown in FIGS. 1, 3 and 5, two top lateral edges of the guiding cover (17) and their adjacent edge wall (12, 14) are respectively provided with an opening (122 or 142, 174) so as to pivotally cover the axle section (81) of a seal (8). The inner edge of the seal (81) has a protruded disc (82) to urge against the inner wall edge of the guiding cover (17). A screw hole (83) is provided at the centre of the seal (8). A screw (84) has a head portion (84a) mounted against the external of the edge wall such that the guiding cover (17) is firmly and pivotally (12, 14) mounted in between the edge wall (12, 14) of the frame body (1). When the guiding cover (17) is rotatably lifted up, the guiding cover (17) does not rub against the screw (84). At the same time, the hardness of the seal (8) is made to be smaller than that of the guiding cover (17). After a long period of use, the seal (8) may be worn out, a new piece of seal (8) can be used to replace the worn out seal and the guiding cover (17) can thus operated smoothly.

Figure 6:
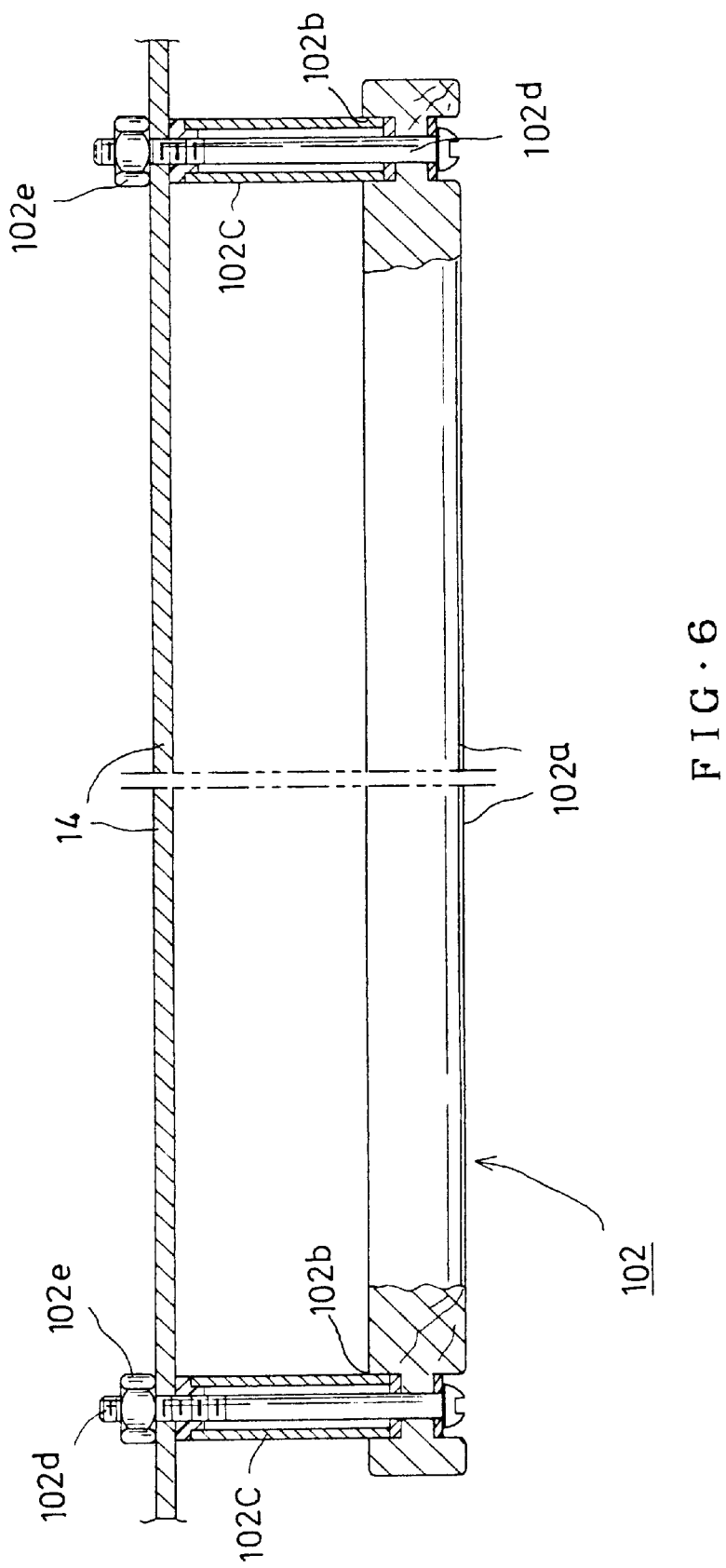
FIG. 6 is a sectional view along line 6—6 of FIG. 1 of the present invention in accordance with the present invention.

Referring to FIGS. 1, and 6, a handle (102) is disposed at the edge wall (14) of the frame body (1), and comprises a handle bar (102a) having a slot (102b) at the end thereof, two conduit (102c) being mounted at the slot (102b) at the respective end of the handle bar (102a) and the other ends of the conduit (102c) being mounted to the edge wall (14), and screw nuts (102d) being used to mount the conduit (102c) and the handle (102) onto the edge wall. In accordance with the present invention, the handle structure can be ng box (4) oused as the handle (32) for the grease collecting box (3) or as the handle (42) for the ash-collectir the handle (52) for the charcoal storage box (5).

Figure 7:
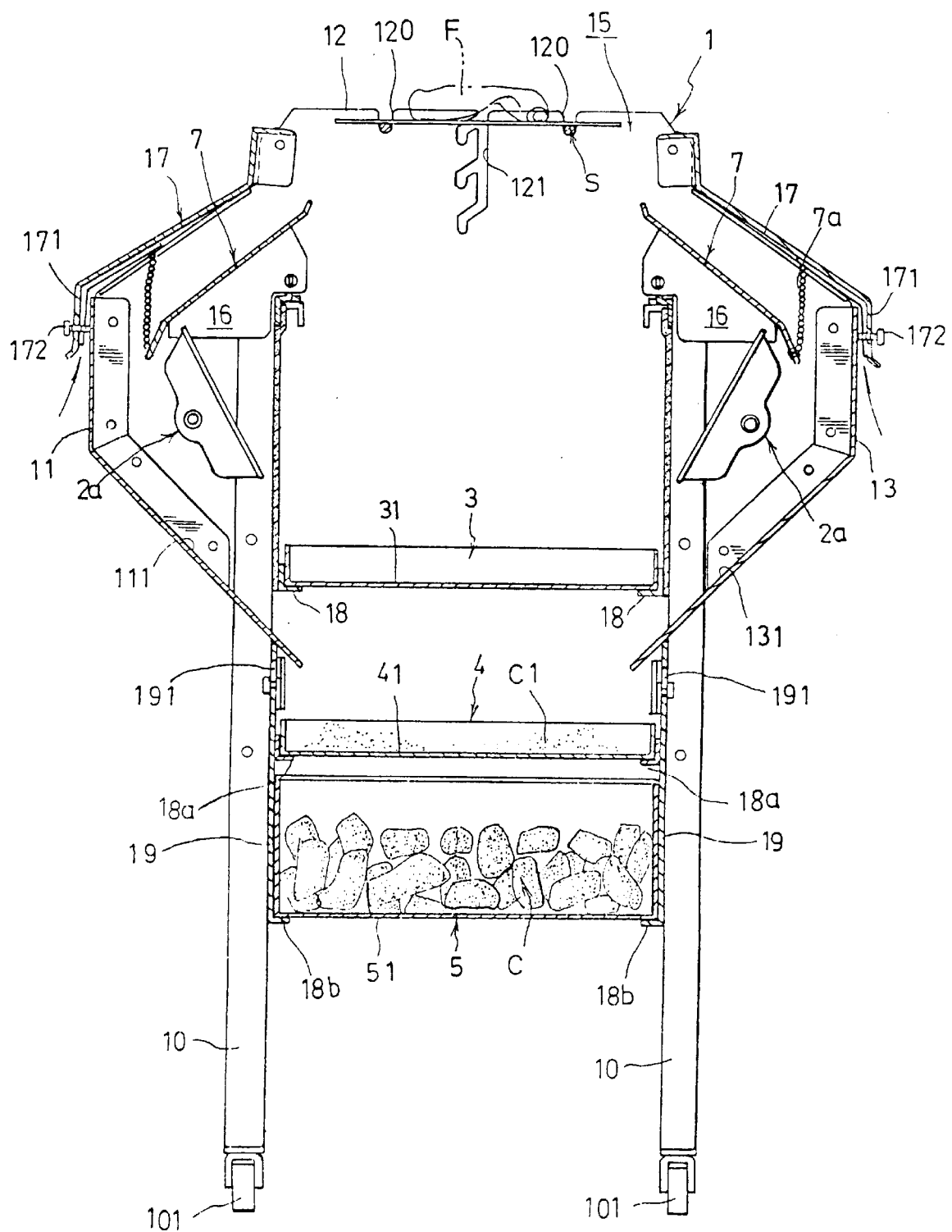
FIG. 7 is a sectional view of another preferred embodiment in accordance with the present invention.

As shown in FIGS. 7 and 8, the heat source at the heat source area (16) can be modified by introducing an infrared stove (2a) using a gas burner, or an electrical heating device.

In accordance with the present invention, the barbecue grill possesses the advantages as follows:

(1) The linking hood (7) located on the top of the charcoal tray (2) (or the infrared stove (2a)) insulates the heat source from direct heating on the guiding cover (17).

(2) A guiding plate (24) is provided across the frame work (21) of the charcoal tray (2) so as to guide air stream into the burned charcoal and into the gap between the guiding plate (24) and the heat insulation plate (23). Thus, the heat dispersion effect is excellent.

(3) The hinges for the guiding cover (17) about the frame body (1) allow smooth rotatably lifting of the guiding cover (17) and thus the longevity of the frame body (1) is increased.

It is readily apparent that various changes and modifications may be made within the heat source region and particularly, the using of a heating tube to replace the charcoal tray (2). Such changes and others may be made without departing from the spirit and scope of the invention which is set forth in the claims appended hereto.

I claim:

1. An indirect heat barbecue grill comprising:

(a) a frame body having a plurality of edge walls having an opening on top of the body, defining a heating/grilling area;

(b) a heat source area being formed within the heating/grilling area of the frame body; and (c) at least a charcoal tray located within the heat source area, characterized in that a suspension bar is provided across the heat source area and a hinged plate is provided at the outer edge of the suspension bar so as to hinge a linking hood, said linking hood covers the top of the charcoal tray and has a board body having a pair of edge wall section extended downward therefrom, said edge wall is provided with apertures to enclose the hinge plate of the suspension bar, a second edge of the linking hood forms an exist and the first edge thereof links to a linking rope, the end section of the rope is linked to a guiding cover hinged at one lateral edge of the heating/grilling area such that the lifting of the guiding cover will cause the linking hood to be lifted up simultaneously.

2. An indirect heat barbecue grill as set forth in claim 1, wherein the charcoal tray comprises a plurality of rods mounted together and has a frame work being mounted with heat insulation board, and a guiding plate is provided at the outer edge of the framework.

3. An indirect heat barbecue grill as set forth in claim 2, wherein an air passage is formed between the guiding plate and the heat insulation board, and the bottom end of the guiding plate is extended to the bottom end of the framework.

4. An indirect heat barbecue grill as set forth in claim 1, wherein the guiding cover is disposed at one lateral edge of the heating/grilling area.

5. An indirect heat barbecue grill as set forth in claim 1, wherein a gas burner is located at the heat source area.

6. An indirect barbecue grill as set forth in claim 1 wherein an electrical heating device is mounted at the heat source area.

* * * * *